United States Patent [19]
Peters

[11] 3,962,961
[45] June 15, 1976

[54] APPARATUS FOR ROASTING MEAT

[76] Inventor: Leo Peters, 750 Plymouth Road, SE., Grand Rapids, Mich. 49506

[22] Filed: Jan. 2, 1975

[21] Appl. No.: 537,892

Related U.S. Application Data
[62] Division of Ser. No. 50,374, June 29, 1970.

[52] U.S. Cl.................................... 99/426; 99/450
[51] Int. Cl.². ......................................... A47J 43/18
[58] Field of Search..................... 99/426, 402–403, 99/425, 446, 450, 467; 126/25, 39; 224/49; 248/146, 163, 309–310, 346, 350; 426/113, 129, 523

[56] References Cited
UNITED STATES PATENTS

| | | |
|---|---|---|
| 1,315,671 | 9/1919 | Kelly ...................................... 99/426 |
| 2,504,237 | 4/1950 | Weissbach ............................. 99/426 |
| 2,569,262 | 9/1951 | Sklavenitis ............................ 99/426 |
| 2,772,627 | 12/1956 | Newell ................................... 99/425 |
| 3,292,831 | 12/1966 | Moen ..................................... 224/49 |
| 3,359,889 | 12/1967 | Young et al. .......................... 99/426 |

*Primary Examiner*—Peter Feldman
*Assistant Examiner*—Arthur O. Henderson

[57] ABSTRACT

Meat is roasted by suspending it on a web that is not hot to human contact regardless of the heat in which the meat is roasting. The weight of the roast is uniformly supported by the web, and the relatively cool web enables the roast to cook evenly.

4 Claims, 13 Drawing Figures

APPARATUS FOR ROASTING MEAT

This application is a division of Ser. No. 50,374, filed June 29, 1970.

BACKGROUND

This invention relates to a method and means for packaging and roasting meats. More particularly, the method provides the housewife with a method and means tailored specifically to, and packaged with, each roasting-type piece of meat she buys that will reduce the loss of meat juices, increase overall tenderness, and improve the "doneness" uniformity of the meat she roasts.

Many factors, internal and external, influence the finished result of roasted meat. This invention is concerned with certain external factors, individually and collectively, as they affect each other and, in turn, the internal finished result of the "cooked" meat. It is the general object of this invention to modify, alter, and/or eliminate certain external factors so that the finished internal result of the "cooked" meat is superior to the results obtainable under the present state of the art.

The art is old and extensive on various pans, frames, and racks (external factors) for roasting meats, but none of them singly, or in combination, present a simple, inexpensive, all-inclusive method and means for curing the deficiencies caused by the factors that are the subject of this invention; factors which have their beginnings in the retail store and continue right on through to the finished roasted result. These factors, and their interrelationships, are those which affect loss of meat juices and the uniformity, extent, and rate of heat penetration; both of which, in turn, have a major effect on the uniformity and the accuracy in the degree of "doneness", juiciness, and tenderness of the roasted meat.

This invention is applicable only to meats that can be roasted, i.e., meats that are cooked by exposure to radiant dry heat in an oven having reflecting surfaces. This is in distinction to meats that are baked, i.e., cooked by substantially confining the meat in contact with the inside of a vessel, whereby heat is conducted thru the vessel's walls to the meat inside.

This invention has particular application to roasts and thick steaks of beef and veal; and of general application for pork and lamb, and to whole-carcass poultry such as turkeys, chickens, ducks, etc., cooked in the home.

For purposes of illustration this invention will be described mainly with boneless beef taken from the rib section of beef loins. Such sections are commonly referred to as boneless "rib roasts". They may also be rolled and tied.

Standard home literature on meat cookery defines the accepted internal qualities of well roasted beef as follows: Color should be even, and its shade match the extent to which it has been roasted; e.g., it should be bright pinky-red for "rare", reddish-brown for "medium", and greyish-brown for "well-done". All of it should be tender and juicy.

The scientific literature on meat cookery indicates how the condition of the meat-cell fibers during roasting affect the general juiciness and tenderness of the finished roast. For example, if the meat-cell fibers are in a relaxed condition (i.e., not contracted from excessive heating or stretched from pressures due to weight-bearing) they hold their juices better, and the meat will "cook out" juicier and more tender. The more relaxed the meat fibers, the less the weight (water) loss, and the juicier and more tender the finished roasted meat.

THE INFLUENCE OF HEAT ON MEAT FIBERS

The roasting temperature, its uniformity, extent and rate of penetration, has a direct and positive effect on the relative relaxation of meat fibers. There are natural collagenase enzymes in beef, which under 140°F. attach and relax (soften and tenderize) the connective cell fibers, which, in turn, also help retain juice within the cell's walls. The higher the temperature over 140°F., the lower the ability of these collagenase enzymes to tenderize the fibers, and the greater the contraction (and hardness and toughness) of the fibers, and the greater the quantity of juices that will be squeezed out of the meat cells.

About 25% of the water (juice) in beef is "free" or "loose", i.e., extra-cellular (outside the protein fibrous cellular structure proper), and 75% is "bound", "immobilized", or inter-cellular (inside the cell fibers). The "free" water is not free in the sense that it is flowing loosely around inside the body of the meat on the outside of the cells. Rather, it is mechanically immobilized by the network of membranes, filaments, cross-linkages, and electrostatic forces between the cellular chain on the outside of the protein (fibrous) cellular structure proper.

There is a continuous transition from the "bound" to the "free" state; a transition that can be remarkably speeded up by the application of very low pressures. Contraction of the cellular fibers, caused by a high-temperature-induced inability of the collagenase enzyms to relax them, will apply such low pressures, and quickly and easily decrease the immobilized water with a corresponding increase in the expressible water. It is quite common under present cookery methods in the home to lose 10% to 15% of a roast's total weight via such cellular contractions. And it is not uncommon to note examples of the rapidity with which temperature increases can disproportionately increase juice losses. for example, a 40% increase in temperature (from 250° to 350° F.), which is not an unusual difference between various housewives' roasting methods, can step up weight loss about 50% (from 10% to 15%). Thus, meat juices are lost, and a tougher, drier, meat roast is the result.

Loss of meat juices and toughening (contraction) of meat fibers from overheating, and/or non-uniform heating, are easily observable phenomena in any home. It is commonly observable in beef that is roasted or broiled at any temperature above the "rare" level of 140°F.

-For example, the common method of roasting a rib roast at home is to place it in an open pan, and/or rack, within an oven. The bottom of the meat rests in direct, weight-pressured, contact with the pan's bottom or the rack's spaced metal surfaces. The meat is usually positioned with the fat side up so fat juices can "seep" downward. The metal pan or rack is always of a relatively heavy non-flexible gauge to support various sizes and weights of meat. Being a better conductor of heat, and having a body of less thickness but greater density, than the meat itself, the body of the metal will more quickly come to, and more constantly stay closer to, the maximum heat of the oven than will the main body of the meat. In addition, the weight of the meat brings its pressure to bear at the points of meat-to-metal contact, which brings into action the well-known fact that pressured heat cooks food faster than non-pressured heat.

To illustrate: If a 4-lb. rib-roast is roasted for 2 hours (30 minutes per lb.) in a 300° F. oven, the metal pan or rack in which it rests will reach 300° at about the same time as the oven itself, while it will take 2 hours for the meat to reach only 140° at its center. With the metal pan or rack constantly close to the heat of the oven, and with 4 pounds overall pressure being exerted at the bottom of the meat, this means that the portions of the roast in direct pressured contact with metal, and adjacent thereto, will be roasting constantly at about 300° (and with 4-lbs. pressure across the meat-to-metal contact area, the roasting effect on the meat in this area is considerably greater than a 300° temperature alone would produce), while the meat not in metal contact will be roasting at considerably lower temperatures and pressures.

When such a roast has reached the 140°F. (rare) temperature at its center, and is removed from the oven for serving, two clearly observable evidences of toughness can be seen:

1. On the outside it will show sear marks (dark brown lines and/or areas) where the meat has been seared (i.e., overcooked) from contact with hot heavy-gauge metal. These sear marks are most visible if the meat is roasted on wire racks, and the sear marks from the wires can be seen in contrast to the meat surfaces that have not contacted the metal.
2. On the inside it will show the following: pinky-red and rare at the center where the temperature reached only 140°, and then from center to outside in deepening shades from pink to greyish brown; and latter evidencing both loss of juice and increased toughness due to increasing heats to which the areas closer to the surface are subjected.

This non-uniformity of roasting will be aggrevated by the following factors. When an oven's heat cycles on and off in maintaining its thermostat setting, the range of heats may be considerable. They may range from 10° to 30° depending on the thermostat, the oven's insulation, and the level of heat. It is common for the cycling range to average around 20° between its high and low points. So it is common for meat that is in contact with metal to be roasting at least 20° higher than the meat not in contact with such metal and considerably higher under the influence of pressured heat at the areas of meat-to-metal contact.

All of the roasting accessories used with present-day beef roasting are of relatively heavy non-flexible gauges. They will hold temperatures longer and remain constantly closer to the higher temperatures within the cycling range than will the ambient oven heat itself. This, combined with the pressures, results in meat at the meat-to-metal contact points being greatly overcooked compared with the rest of the meat.

In addition to the problems of overcooking, toughening, and de-juicing of the meat adjacent to the metal contact points, the juices which seep and leak out of the roast and collect at the bottom of a metal pan, around the bottom of the roast, serve as a boiling medium, so that in addition to being subject to greater heats and pressures, this area is also subject to being boiled. The combination of these factors produces meat considerably more well-done than in those areas not so subjected.

The phenomena observable when roasting with heavy metal accessories are also observable when roasting a rib roast with the ribs in the meat. The rib bones being of greater density than the meat, they conduct and hold heat somewhat similar to metal, and the resulting roast shows somewhat similar effect: the meat adjacent the bones is always more "well-done" than the rest of the meat.

Regardless of the particular temperature at which a housewife desires to roast her beef, but especially if she wishes to stay under the critical 140°F. temperature to insure an evenly rare result all the way from center to the outside, it is imperative for good beef-roast cookery that all the factors affecting the final result, but especially those affecting the heats to which the meat is subjected, be carefully controllable.

It is a primary object of this invention, therefore, to provide a method and means, specifically designed for every individual cut of beef roasted as home, that will allow a more even and uniformly accurate penetration of cooking heat (at whatever level) so that the tenderizing activity of the collagenase enzyms may be more evenly and uniformly controlled throughout every specific roast, so that, in turn, the relative relaxation (i.e., relative non-contraction: relative toughness-tenderness) of the meat fibers during the roasting process are more evenly controlled, which, in turn more evenly and uniformly controlls the amount of water (i.e., juice) loss and the relative juiciness of the finished roast.

The Influence of Weight-produced Pressure on Juice Loss

Loss of meat juices can also be caused by weight-exerted pressure whereby the meat-cell fibers become so stretched and distended, so unrelaxed, and the extra-cellular network of membranes and linkages so distorted and broken, that juice is squeezed out in this manner too. First the "free" juices leak out, and if the pressure is sufficient and continuous, the cell fibers may also stretch and weaken to the point that "bound" juices are also released in quantity. The weight-exerted pressures that can produce this loss of juices is of the order of less than ¼-lb. per sq. inch, a weight pressure that easily can be produced by an ordinary size beef roast from its own weight.

Loss of meat juices from weight-exerted pressures is a common observable phenomenon. Its evidence is widespread in the "blood" (meat juice) soaked paper wrappers and/or "blood" collections in the plastic wrapper trays packaged with meat purchased by housewives. This phenomenon is observable already in such retail stores where beef cuts may be too tightly wrapped, tied, and/or piled on top of each other in the meat case. It usually becomes more evident after the meat has been handled, tumbled, crushed, and pressured in the non-refrigerated trip from store to home. It is not uncommon that from 3% to 6% of a rib roast's total juice content is lost in this manner.

This juice loss from weight-produced pressure continues high in the roasting oven because present day roasting accessories and/or methods, fail to provide the best means for distribution of a specific meat-cut's own weight. More often than not meat is positioned and/or supported in a manner that the maximum, rather than the minimum, amount of weight is bearing down on its resting surfaces.

It is here that the shape and size of a meat roast also has important influence on the pressures bearing on the meat cells located in the area on which the meat rests. For example, a 4-lb. boned, rolled and tied rib roast of about a 6½ inch diameter and a 4 inch thickness shows the following weight-produced pressures and weight losses:

When resting on its:
—circular (narrow) 4 inch across side: 4-lbs resting on about 16 sq. inches = ¼-lb. pressure per sq. inch.
— flat (wide) 6½ inch diameter side: 4-lbs. on about 32 sq. inches = ⅛th-lb. pressure per sq. inch.

A ¼-lb. or ⅛-lb. per square inch pressure may not appear to be much, but it is sufficient to force a substantial amount of juice out of a 4-lb. rib roast; out of meat membranes that are relatively weak, insofar as pressure-withstanding vessels are concerned. This amount can easily equal 6% of the entire water content of the roast, and up to 25% of the water content (all of the "free") of the area most immediately affected by the pressure.

A noteworthy fact for this invention is that, in the case of our sample, a 50% reduction of pressure (from ¼-lb. per square inch to ⅛th-lb. per square inch) can reduce juice loss (increase juice retention) by about the same percentage, and with this sizable increase in juice retention also comes a corresponding increase in tenderness and an ability to achieve rareness. It is desirable, therefore, that weight-produced pressures from whatever cause, be reduced to a minimum.

It is a second primary object of this invention, therefore, to provide a method and means specifically designed to tailored to, and packaged with, every individual meat roast purchased in a retail store that will always reduce to the minimum of each specific roast's weight alone the amount of per square inch weight (or pressure) on its weight-bearing surfaces at any and all junctures in its journey from the retail meat case thru the roasting oven, so that, in turn, the weight-produced pressures on the meat fibers in the vicinity of the weight-bearing surfaces will be reduced to a minimum, which, in turn, will reduce juice loss due to pressure to the minimum.

THE DESIRE FOR RARENESS

In addition to tenderness and juiciness, the degree of "doneness" or "rareness", in beef roasts especially, is of critical concern to today's housewife. Rib roasts are one of the prized entrees most frequently used for special dinners in the home. Because of this, a housewife is seriously, even nervously, concerned over the results of her cookery with this item. She has good reasons for being nervous because her results usually fall considerably short of her hopes and expectations; many of them outright failures.

These failures, both in number and extent, generally increase in direct proportion to the degree of rareness she is trying to achieve. If she is seeking to have her roast "medium" (i.e., midway between "rare" and "well-done") or "medium rare", she is dealing in degrees of "rareness" that require tight control over the interrelated factors that influence the desired result. Such control increases in difficulty and criticalness as the desired result goes from "well done" to "medium" to "medium rare" to "rare". To achieve a roast that is truly "rare" (i.e., pinky red) from center to substantially the outside, and uniformly so thru the entire body of the roast, is an accomplishment very few housewives are able to achieve. Very few of them are even able to control the several external factors that influence an accurate desired internal result.

More often than not in today's home cookery, if the housewife wants a "rare" rib roast, it will come out "raw" (i.e., substantially uncooked) in the center, "rare" midway between center and outside, and "well-done" in various depths along the outside. Or, if it is "rare" at the center, it will be "well-done" in varying degrees from midway to outside.

The appetite for beef roasted rare has increased markedly in recent years. Today the majority of consumers prefer their rib-roasts rare, or at least medium-rare, rather than "well-done". This preference has been stimulated by a growing empirical awareness that such meat is more flavorful, more tender and juicier, than meat roasted "well-done".

These housewives who wish their beef rare, use the well-known standard temperature guide of 140°F. internal temperature in their attempts to achieve the desired "rareness". Both her preferences for "rareness" and her use of the 140° guideline, have firm bases in the known scientific facts that: (1) at the 140°F. line the natural collagenase enzymes are still within a favorable temperature climate to actively attack the tough fibrous connective tissues, while at the same time cooking the meat so it is no longer "raw", while above 140° these enzymes become inactive; and that (2) "rare" beef is measurably higher in flavor, juice, and tenderness.

The pressure on the juices in beef cells, either from contraction of their fiber walls due to excessive heat (and therefore inactivity of the collagenase enzymes) or from distortion of the fibers due to weight-produced pressures, has a direct effect on a housewife's ability to obtain the degree and uniformity of "rareness" she desires. To the extent that a beef cut has lost its original juice, to that same extent it has lost its ability to "roast-out" rare. My objectives of greater tenderness from better heat control and more juiciness from better pressure control therefore also have a direct and related influence on the ability of a housewife to achieve a "rare" beef roast.

It is therefore a third primary objective of this invention to supply the housewife with a simple, inexpensive, method and means tailored to, and packaged with, every meat roast she buys, that will more accurately and conveniently enable her to produce finished roasts that are more predictably and uniformly rare.

A UNIVERSALLY ADAPTABLE ACCESSORY PACKAGED WITH EVERY ROAST

Prior art presents a prolixity of methods and means (e.g., pans, frames, and racks) that allegedly, but not actually, achieve some of my objectives. For example, there is a large variety of rotisseries designed to keep juices that have been forced to the surface from dropping off the meat and to provide an even penetration of heat. This is allegedly done by keeping the excreted juices flowing in contact with the meat's surface by rotating it on a spit. But, at the same time heat-conducting, and therefore fiber-tightening and juice-extracting prongs pierce far into the interior of the roast, nullifying in large part the sought-for objective of juice retention; an objective that is allegedly obtainable by this method, but is neither empirically nor scientifically provable.

Other devices in the prior art pick up and pour back on the meat juices that have already dropped off. There is no evidence to indicate that once the juice has been forced out of contracted cells the process can be reversed and the juice forced back in. There is no empirical or scientific proof to support the idea that this kind of "basting" results in a net reduction of internal juice loss.

Still other devices are designed simply to keep meat raised up from contact with the bottom of a pan to allow even heat circulation and/or to fit special carcass contours of poultry; but these do not per se distribute pressure-producing, fiber-stretching weights evenly.

The pans, frames, and racks available for purchase are of such comparatively large sizes and shapes that most housewives do not have kitchen storage space for more than 1 or 2 of them. Also, all are too expensive to be purchased and discarded (like a tin can) with every particular roast she buys. Thus, because the various meat roasts have considerable variety in their shapes, sizes, and weights, and because the very few pans, frames, or racks possessed by the average housewife fit all the roasts she buys, she is limited in her ability to coordinate the two situations so they could cooperate to minimize weight-produced pressures and maximize meat-cell fiber relaxation, during roasting.

Nor can the average retailer be of much help to correct this lack of coordination and cooperation between what he sells and the apparatuses on which the meat may be roasted in the home. Nature, and the economics involved, limit the retailer in the extent to which he can tailor and reshape roasts to fit the precise pan, frame, or rack in which every particular housewife may wish to roast her meat. So the majority of housewives suffer with what is presently available; both in the meat cuts they can buy, and the roasting accessories they have at home.

All of the prior art in the meat-roasting-accessory field have several serious deficiencies in common:

1. None is really an all-purpose accessory capable of distributing pressures from weight-bearing to the best possible advantage for the reduction of juice losses. All are made of relatively heavy-gauge metal, and therefore of rigid construction. They lack the flexibility needed to fit smoothly around each different size and shape of roast. Therefore, the modern housewife is really without a direct, simple, universally-applicable, perfect-fitting device for all roast-meat contours and shapes that will provide the maximum weight-distributing function for reducing to the minimum the fiber-stretching and juice losses due to pressure from weight.

2. None of it is capable of functioning as a good relaxer of meat fibers whereby to improve control over both tenderness and juiciness. As a matter of fact, because they are all made of metal that is relatively heavy, dense, and rigid, and because all of them in varying degrees are in direct pressured and/or meat-pierced contact with their roasting meats, they do just the opposite. The meat used in all the prior art has heat-exchanging and heat-retention properties that promote, rather than retard, searing and over-roasting of meat at is points of contact with roasting meat. So the greater the area of metal-to-meat contact in the prior art field, the greater the difficulty in controlling the uniformity of the roast. Metal surfaces act as heat exchangers; transferring low temperature heats out of, and high temperature heats into, the meat, both in intensity and continuity. Heavy gauge metal, in its entire body, is always closer, more instantly and continuously so, to the highest heat of the oven's heat-cycling range than is the body of the meat. Therefore, these higher heats and greater pressures in the areas of meat adjacent to the metal-to-meat contacts produce meat that is always more "well-done" and over-roasted than it is in the main body of the meat.

The exception of this general metal-to-meat rule is when the metal is of such a thin gauge as to classify as a metal foil. When meat rests on a metal foil which is supported by and suspended over a heavier gauge metal pan, and the resting meat is separated from the heavier gauge metal pan by a peripheral area of the foil all around the base of the meat, then a surprising condition results; a result that is similar to having meat rest on a non-metallic, relatively non-heat-conducting surface. Such metal foil, on a per-square-inch measurement comparison with meat-juice surfaces, is lighter in weight and of lower density than the juice; it will actually float on top of a pool of such juice. Such metal foil is also cool to the touch of one's hand even though other metal in the oven, and even the surface of the roasting meat, is burning hot to the touch. Thus it will function for my invention similarly to such non-metallic substances as cotton or plastic webbing or mesh. As a rule-of-thumb reference on the functioning of metal foils: if the human hand can touch them without hurting while they are in the oven with roasting meat at temperatures considerably above body heat, then such foils will function for the purposes of this invention; i.e., if the metal foil is actually cool to the human touch when the oven walls are too hot to touch, then such metal may be used for the structure, and in the functioning, of this invention.

3. None of it is sufficiently inexpensive to be purchasable and disposable with every roast the housewife buys. Therefore it is all economically and commercially impractical for packaging with, and tailoring to fit, the design need of every cut of meat.

Thus, on the one hand (1) when a housewife purchases meat for roasting, she is confronted with a wide range of sizes, shapes, and weights, while on the other hand (2) she is confined within narrow limitations on the sizes, shapes, structural and metal make-up of the pans, frames, and/or rack accessories she has at home on which to roast her meat, so that (3) very few of the roasts she buys will fit into and/or be accommodated by her cooking accessories in the best possible heat-distributing, fiber-relaxing, pressure-relieving, juice-retaining manner.

It is a fourth primary objective, therefore, to provide the housewife with an inexpensive, frame-suspendable flexible, hammock-like, universally adaptable, low-density, non-heat-retaining, web of material on, and/or in, which her meat can rest while roasting, which is tailored to the shape and size of, and packaged with, every roast she buys, and which will function to the best advantage of the first three primary objectives.

The interrelationship, and the overall combined objective, of the four primary objectives may be summarized as follows:

A roasting accessory that is:

1. specifically adaptable to, designed to fit, and economically feasible for packaging with, each individual item in the wide range of weights, sizes, and shapes of various meat roasts, and which 2. will universally and substantially improve the predictability of roasting results, especially in terms of rareness for beef, and which will also substantially improve relaxation of meat fibers caused by either
3. heat or
4. pressure, and thus
5. improve fiber tenderness and reduce loss of meat juices accumulated from the time of purchase through the time of roasting.

None of the prior art in the meat-roasting field either singly or in combination discloses such a method and means. None of it (1) is specifically designed to fit, or is commercially feasible for packaging with, each individual item in the wide range of weights, sizes and shapes of various meat roasts, and which (2) will universally and substantially improve the predictability of the roasting results, especially in terms of rareness, and which will also substantially improve relaxation of meat fibers caused by either (3) heat or (4) pressure, and thus (5) improve fiber tenderness and reduce loss of meat juices accumulated from time of purchase thru time of roasting. It becomes, therefore, the overall primary purpose of this invention to achieve these five interrelated primary objectives.

JUICE COLLECTION AND PRESERVATION

The liquids (i.e., juice mixtures of water, proteins, and fats in the oil phase) that leak out of and drop off roasting meats also present problems for the housewife. If the juices collect in the bottom of a pan in which a roast rests, they function as a liquid in which meat is boiled instead of dry-roasted. This is a common situation, and it results in meat at the bottom of such pans that is always well-done; it is boiled instead of roasted. Even if other portions of the meat are rare, this portion will be well-done. It is desirable, therefore, if meat is to be roasted rare, that such excreted juices be drained away from, and be prevented from accumulating around the bottom of roasting meat.

Furthermore, if the juices are collected in a metal pan, whether or not in contact with the meat, the water portion gradually evaporates and the fat portion spatters out of the pan, so that with lean meat, only a dry residue of protein matter remains, usually stuck firmly to the bottom of the pan. If a housewife wishes to make gravy of this she has difficulty reconstituting and de-lumping it.

While the amount of juice excreted from meat roasted by means of my invention is relatively small, and in many instances nil, it is desirable to be prepared to dispose of and/or accommodate it if and when it does excrete. My invention is admirably suited for such an accommodation because my elevated web-holding-frame-structure provides a substantial space between the meat-holding-web and whatever base within the oven on which my web-holding frame must rest; a space fully adequate to accommodate a small bowl, saucer, or a formed film pocket attached to the underside of my web to catch and hold any draining juices in a relatively non-evaporable condition.

It is therefore a fifth object of this invention to provide a juice drainage and collection means that can drain away, collect, entrap, and/or hold released roasting meat juices without evaporation or spattering.

The five major objectives of this invention are designed to accomplish the following 10 detailed functional advantages:

1. A method and means for roasting meats that is universally applicable and individually adaptable to the wide variety of weights, sizes, and shapes found among the meats that are the subject of this invention, that
2. is sufficiently low-cost so it will be commercially purchased and accepted as a disposable, expendable item that
3. can be tailored to fit compactly around, and provide a protective weight-bearing housing, and/or surface protector for every individual piece of meat with which it is sold, so that it becomes an integral part and/or accompaniment of a retail package, and
4. structured, so that at the time of roasting in the home, its function will change from one of a protective packaging role to a supportive roasting role best suited to hold the roast in a position that
5. wil elevate and isolate it against contact with heat-retaining, meat-searing, surfaces of objects within the oven, and
6. suspend the roast in, and/or on, a flexible, cool-to-human-touch, hammock-like web that can be flexed and moved to conform to, and enfold, the contacted surfaces of the roast, so that
7. a maximum amount of the roasts's surface is in contact with the web so that, in turn, a maximum amount of the roast's weight is distributed across a maximum amount of weight-bearing surface, and
8. permits the roast to be positioned so that the narrowest overall dimension can be in perpendicular (least amount of weight bearing) relationship to the enfolding, supporting, web platform or sling, so that (6), (7), and (8) working together result in a minimum of weight-producing pressures that otherwise would act to press out the juice in the area where weight-bearing is greatest, and
9. separates and/or isolates the roasting meat from any contact with any material that has a per-square-measure-weight greater than the surface-weight resistance of meat juices and/or has better heat-retention properties than the meat itself and/or is hotter to the human touch than is the ambient heat within the oven, and
10. permits excreted juices to drain and escape, and reduces their collection around the base of the roasting meat; enabling collection instead in a moisture-retaining pocket or vessel underneath the suspended meat.

DESCRIPTION OF THE DRAWING

Several embodiments of the invention are illustrated in the accompany drawing in which.

DESCRIPTION OF SPECIFIC EMBODIMENTS

Figure 1:
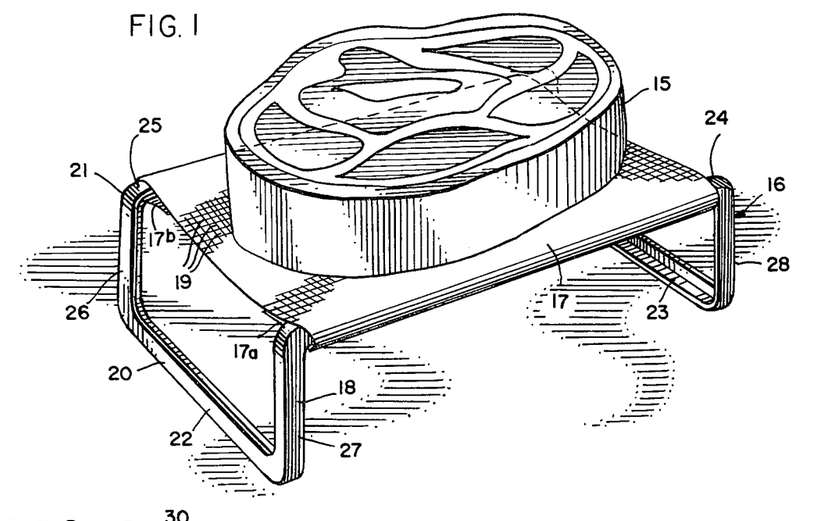
FIG. 1 is a perspective view of a roast suspended for roasting on one form of the inventive apparatus.

Referring to FIG. 1, a roast 15 is suspended for cooking by roasting apparatus 16 which includes a web 17 supported by a frame 18. The web is sufficiently non-heat absorbent and/or sufficiently fast in heat-radiation, convection, and/or conduction that it is not hot to the human touch regardless of the temperature at which the meat is roasting. The human hand should be able to touch and/or hold my webbing without being burned or feeling pain. My web is so thin, and/or non-heat retaining, that only fine thermocouple instrumentation could measure its temperature. Since this is neither available nor practicable for a housewife to use, I prefer to use human body heat as a temperature indicator for the desired non-heat retaining function of my webbing. This low heat-retention quality of my webbing is necessary to prevent over-cooking (overheating) of the kind that is now present with the heavy-weight metal accessories used in today's meat cookery.

In addition to the necessary low-heat retention quality, my webbing should be sufficiently flexible so that it will function like a cradle or hammock in draping and conforming itself to the resting surfaces of the meat during roasting. Preferably it is of an open or perforated nature, or with sloping grooves, to permit liquid juices to drain and escape and thus prevent a pool of juice collecting underneath and around the base of the roast; a pool which would tend to boil the meat in that area. With such a webbing, the meat that rests on it is literally dry-roasted around its entire surface. Furthermore, the perforations and/or drain grooves permit the escaping juices to be collected in a small pocket or vessel underneath the webbing in a manner that will keep them from evaporating and frying; and thus preserve them for easy use in making gravy.

Such materials as high-heat-resistant, flame retardant, non-heat-retaining, and/or non-inflammable cotton, paper, glass, or plastic open-mesh fabrics with mesh sizes within the range of about 0.1 inch to about 1.0 inch or perforated films with perforations of sufficient size to permit meat-juice drainage; certain formulations of such thermoplastic films as the cellulose triacetates, polyamides, and polysulfones, in gauges within the range of about 0.001 inch to about 0.01 inch depending on the weight of meat to be supported and thin metal foils in the gauges normally sold for household use, are all candidates for the webbing in my invention.

The particular web 17 illustrated in FIG. 1 is formed of mesh material having openings 19 through which the juice may drain from the roast.

To protect my roast against pressures from outside weights, while at the same time provide a means for suspending the roast on a webbing while roasting, I provide a frame 18 shaped to perform both of these functions, and packaged around the meat and inside a wrapper or carton that holds the meat, webbing, and frame in fixed positions so that the frame and webbing can perform their combined protective, in-transit, housing function. At point of end use the wrapper or carton is removed and the meat placed on top of the frame-supported web for roasting.

My frame is preferably structured from plastic or metal tubing, rods, or angles, whichever is closest to the lowest cost in relation to weight supporting ability. Such a frame is made in size and shape to conform to individual sizes, shapes and weights of meat-cuts. It is formed and shaped to function both as a sling-like or hammock-like support for my webbing during the roasting process, as well as a protective-housing for the meat against outside bearing weights while the meat is in transit from the meat packaging plant to the consumer's home. In its protective-housing role it has dimensions which circumscribe and encompass the general overall cubic dimensions of the meat it is protecting. Thus when it changes to its hammock-like role during roasting it per se suspends, elevates, and spaces the roasting meat away from whatever base within the oven on which it rests, and does so at a distance at least equal to the height dimension of the meat it encompassed while in transit through the channels of trade. Suspending and spacing the meat at such a distance, from whatever base the frame is resting on in the oven, is adequate insurance that sufficient ambient heat separates the meat from any high-heat-retaining and heat-reflecting surfaces that otherwise, from close proximity, might over-cook the roasting meat.

Such a frame should preferably approximate the cost of a tin can used for canned foods.

The particular frame 18 illustrated in FIGS. 1–5 has a base portion 20 and a web-supporting portion 21. The base portion includes a pair of spaced-apart generally parallel rods 22 and 23, and the web-supporting portion includes a pair of spaced-apart generally parallel rods 24 and 25 which extend generally perpendicularly to the rods 22 and 23. The rods 24 and 25 are supported above the rods 22 and 23 and connected thereto by four connecting rods 26, 27, 28 and 29. The particular rods 22–29 illustrated are formed from an integral rod which is bent to form the frame 18 and which is generally L-shaped in transverse cross section to provide a sturdy yet light-weight structure.

The web is seen to include a pair of end portions 17a and 17b which are wrapped about the rods 24 and 25 and secured by adhesive, stitching or the like, to the under-surface of the web to suspend the web in hammock-like fashion. The spacing between the rods 24 and 25 is such that the particular roast 15 which is to be roasted with the apparatus is supported completely by the web and does not touch the frame.

The connecting rods 26–29 space the roast upwardly away from the bottom surface of the oven to protect the roast from the heat of the oven surfaces. The length of these connecting rods is preferably at least as great as the thickness of the roast if it is desired to use the frame as a protective housing for the roast while it is in transit from the meat packaging plant to the consumer's home.

Figure 2:
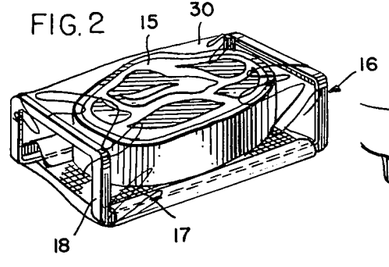
FIG. 2 is a perspective view of the roast packaged within the roasting apparatus of FIG. 1.
Figure 3:
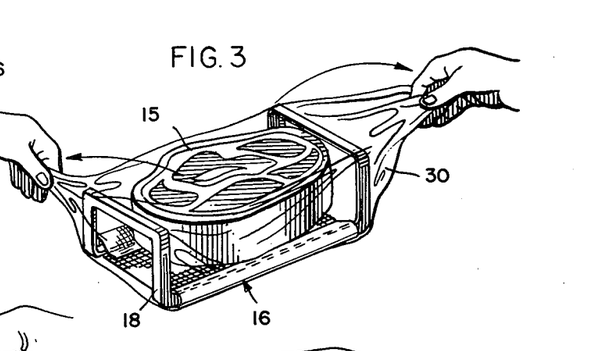
FIG. 3 is a view illustrating the step of unwrapping the package shown in FIG. 2.
Figure 4:
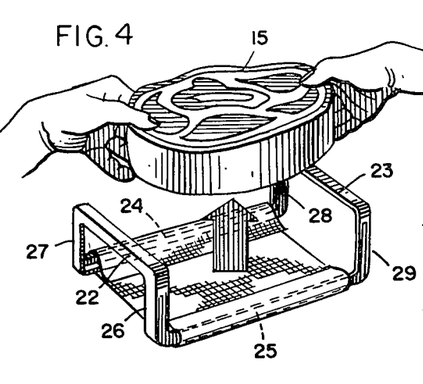
FIG. 4 illustrates the removal of the roast from the roasting apparatus which has served as a package.
Figure 5:
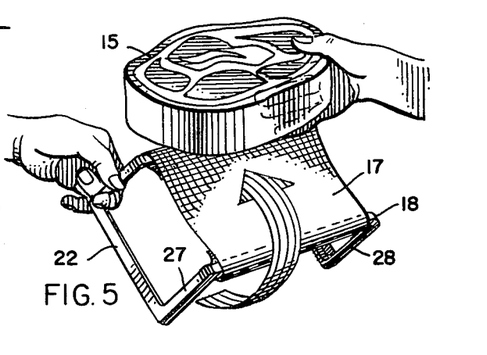
FIG. 5 illustrates the repositioning of the apparatus to serve as a roast support as shown in FIG. 1.

Referring to FIG. 2, the meat 15 is packaged within the roasting apparatus 16, and an outer wrapper 30 covers the roasting apparatus and the meat. The rods 24 and 25 are longer than the length of the meat, the rods 22 and 23 are longer than the width of the meat, and the connecting rods 26–29 are longer than the thickness of the meat so that the meat is completely encompassed by the connecting continuous-rod frame. The meat rests on the web 17 and the frame protects the meat from meat packages which may be stacked thereabove. When the consumer desires to roast the meat, the wrapper 30 is removed as shown in FIG. 3, the meat is withdrawn from the protective frame as shown in FIG. 4, the roasting apparatus is inverted as shown in FIG. 5, and the meat is placed on the web for roasting as shown in FIG. 1. The area of the meat-supporting portion of web is seen to be slightly greater than the area of the surface of the meat that is supported so that the upward force per unit area exerted on the meat is minimized.

Figures 6, 7, 8, 9:
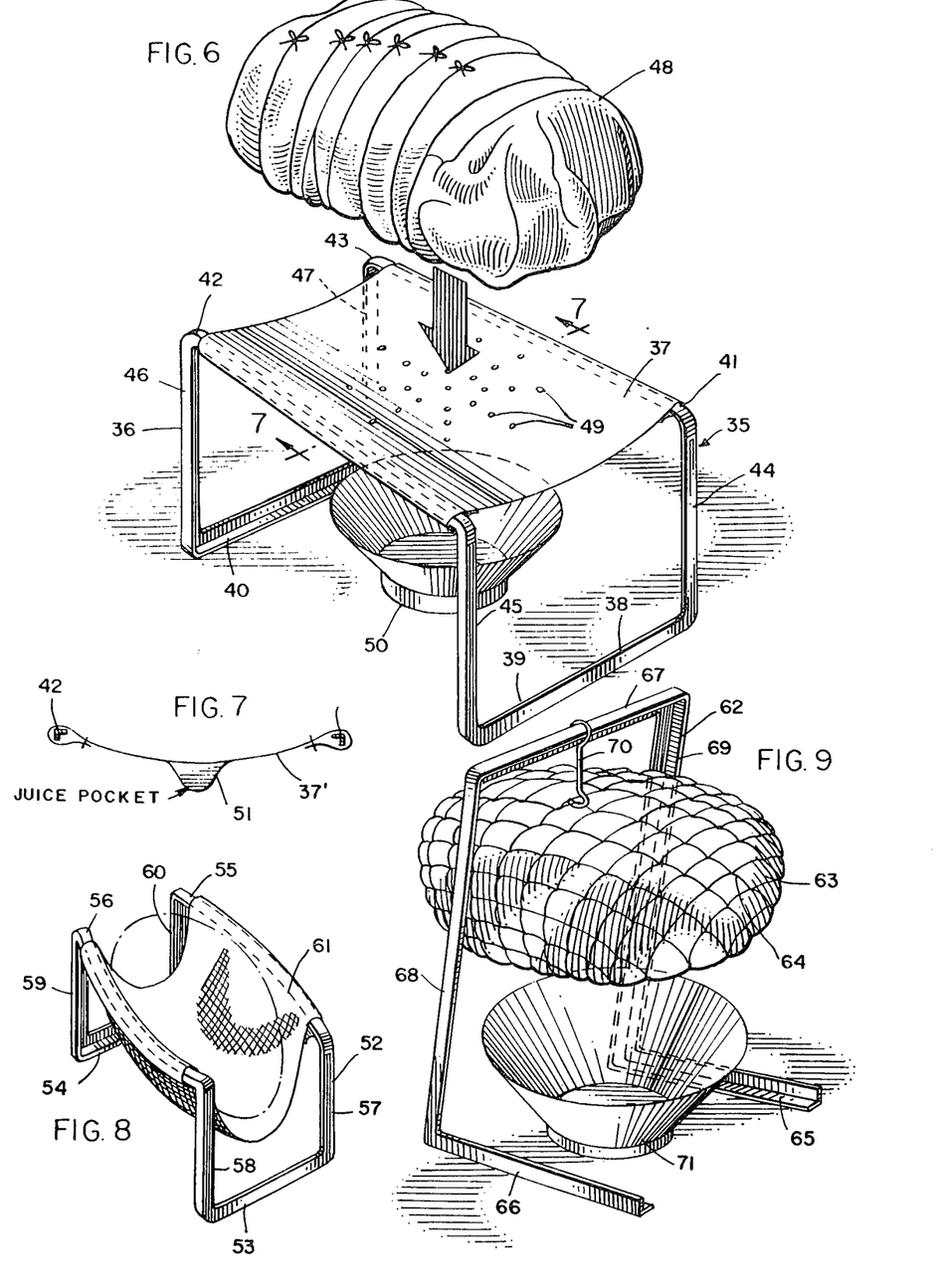
FIG. 6 is a perspective view of a modified form of the inventive apparatus for supporting a roast.
FIG. 7 is a sectional view taken along the line 7—7 of FIG. 6 with a juice-collecting pocket sealed to roast-supporting web.
FIG. 8 is a perspective view of still another embodiment of the invention.
FIG. 9 is a perspective view of another embodiment of the invention.
Figure 10:
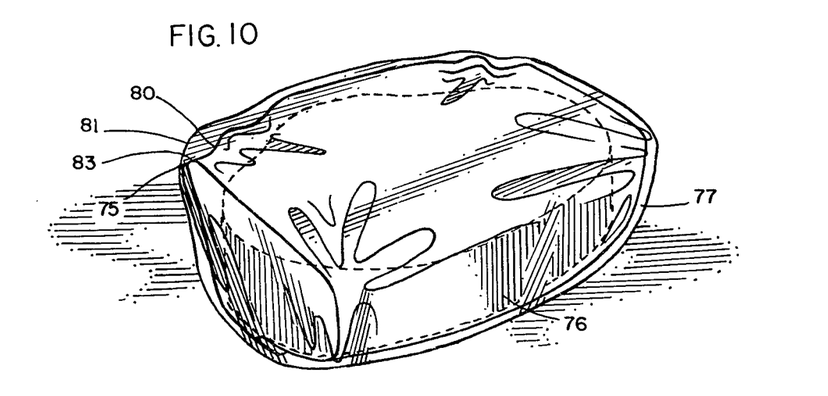
FIG. 10 is a perspective view of a roast packaged with a roast-supporting web.
Figure 11:
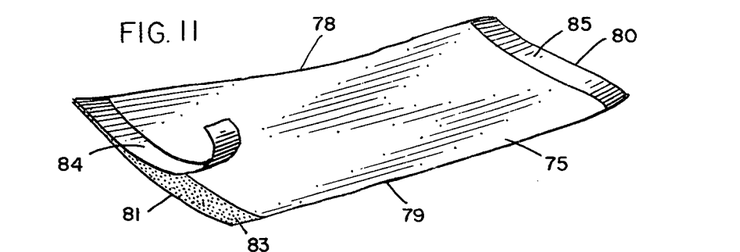
FIG. 11 is a perspective view of the web of FIG. 10.
Figure 12:
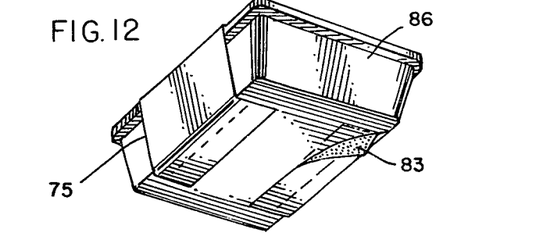
FIGS. 12 and 13 are perspective views illustrating the use of the web of FIG. 11 in combination with a conventional pan to support a roast.

Referring now to FIG. 6, a modified roasting apparatus 35 includes a frame 36 which supports a web 37. The frame 36 is similar to frame 18 and includes a base portion 38 which includes spaced-apart rods 39 and 40 and a web-supporting portion 41 which includes spaced apart rods 42 and 43. Connecting rods 44, 45, 46 and 47, which are slightly longer than the connecting rods of the apparatus 16, join the web-supporting portion and the base portion.

A boned and tied roast 48 is suspended for roasting on the web 37, which is formed of metal foil and provided with perforations 49 in the central portion thereof for allowing juices to drain away. A juice-collecting cup 50 may be positioned below the perforated portion of the web between the base rods 39 and 40. Once again, the spacing of the rods 42 and 43 is such that the roast 48 is completely supported by the web 37 between the rods.

An alternative web 37 which permits the apparatus 35 to be used without the juice-collecting cup 50 is shown in FIG. 7, which is a sectional view of the modified web as would be seen along a line 7—7 of FIG. 6. The web 37 includes a juice-collecting pocket 51 secured to the under-surface of the web below the perforated central portion thereof. As juice drains from the meat through the perforations 49, it is collected by the pocket 51, thereby preventing the formation of a pool of liquid adjacent the bottom surface of the oven which may boil and evaporate.

FIG. 8 shows still another embodiment of the roasting apparatus which is particularly suitable when used with somewhat oval boned and tied roasts. Frame 52 includes base rods 53 and 54, web-supporting rods 55 and 56, and connecting rods 57, 58, 59 and 60. The rods 55 and 56 are seen to be arcuate or curved, having their greatest separation at approximately the midpoints thereof. Mesh web 61 is supported by the rods 55 and 56 in the manner hereinbefore discussed and is seen to drape substantially downwardly toward the base rods 53 and 54. A generally oval-shaped roast indicated by the dashed line can be conveniently supported by the web out of contact with the curved support rods 55 and 56, and the web will support the roast throughout a substantial portion of the curved periphery thereof by virtue of the downward draping of the web.

The invention also contemplates the roasting of meat without the use of a supporting web. Referring to FIG. 9, a frame 62 supports a boned and rolled roast 63 which is tied with a plurality of ropes or strings 64 in the conventional manner. The frame 62 includes a pair of spaced-apart base rods 65 and 66, a support rod 67 and connecting rods 68 and 69. A hook 70 is secured to the connecting rod 67 and is hooked on to one of the tie strings 64, thereby utilizing the tie strings to provide a hammock-like support for the meat. A juice-collecting cup 71 may be positioned below the meat if desired. The spacing between the connecting rods should be such that the meat does not contact any of the metal rods.

An alternative method and means for achieving certain of the objectives of my invention is to provide a web-construction fitted with attachments such as clips, tie-strings, hooks, weighted ends, releasable adhesive strips along opposite ends, or any other means which will enable the web to be spread across the upright edges of a cake or sauce-pan (types of pans which every household possesses) and hold it in this position so as to support the weight of my roasting meat. This alternative web-supporting, framework, method provides an extremely inexpensive means for practicing the most important phase of my invention. It is especially adaptable for use with frozen meats since such meats do not require protection against weight pressures while intransit through the channels of trade, but they do require protection against scuffing, abrasion, and freezer-burn. For these purposes my webbing provides better protection than just a carton or wrapper. So, for these purposes my web performs a superior functional service, over against conventional and less-expensive wrapping materials in addition to its primary purpose as a cool web on which to roast meat.

Figure 13:
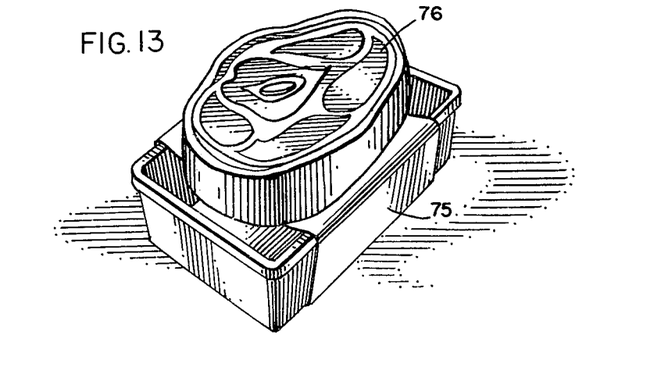

For example, referring to FIGS. 10–13, a plastic web 75 is packaged with a meat roast 76 enclosed within an outer wrapper or carton 77. The web 75 is longer than the width of the meat and is packaged within the wrapper 77 in a wrapped-around-meat condition to provide protection for meat surfaces against scuffing, abrasion, and freezer-burn. The web includes a pair of longitudinal edges 78 and 79 and a pair of transverse edges 80 and 81. A strip of pressure sensitive adhesive 83 is provided adjacent each of the transverse edges of the web, and the adjesive is protected by release strips 84 and 85. When the meat is removed from its wrapper 77, the web 75 may be wrapped around a conventional pan 86 and secured by means of the adhesive strips 83 which stick to the bottom of the pan, as shown in the perspective from the outside bottom of the pan in FIG. 12. Preferably, the size of the pan is such that the roast 76 can be supported by the web 75 between the sides of the pan as illustrated in FIG. 13 so that the meat will not be supported or contacted by metal.

From the foregoing, it would seen that my invention has several surprising aspects:

1. Its utter simplicity in performing several diverse and even contradictory functions, while remaining extremely low in cost.

2. The ability to perform these functions, and thus produce a long-sought-for beneficial result, in a manner that is uniquely new and different within a field of patented art that is voluminous.

3. A dual-purpose structure that during the marketing phase of its functional life serves as a protective enclosure for a piece of meat, and then during its home-use phase changes function to become a hammock-like platform or sling supporting and suspending the meat in a maximum weight-distributing manner during roasting, and free from any contact with surfaces too hot for the human hand to touch. Thus, a structure for achieving the sought-for advantages during the packaged phase is also the same structure, but in a reverse functional relationship to the meat, that achieves the sought-for advantages during the roasting phase.

4. Complete adaptability for performing all the required functional objectives for all sizes, shapes and weights of meat-cuts.

5. Ability to reduce in roasting meat the known scientific internal causes of juice loss and fiber toughness by use of an external method and means.

6. Roasting meat at temperatures too hot for sustained human body contact, while resting the meat on a webbing that is always comfortable for such contact.

While in the foregoing specification, a detailed description of specific embodiments of my invention were set forth for the purpose of illustration, it is to be understood that many of the details hereingiven may be varied considerably by those skilled in the art without departing from the spirit and scope of my invention.

I claim:

1. An apparatus for roasting meat comprising a frame and a flexible, relatively non-heat-retaining web supported by the frame, the web having a length and width greater than the length and width of the meat that is to rest and be roasted thereon and being formed of a material which is sufficiently flexible to permit the web to conform to the contour of meat of various shapes and of a material which is comfortable to the human hand at roasting temperatures of meat, the web being adapted to support the meat out of contact with the frame, the frame being adapted to support the web and the meat within an oven out of contact with the oven's surfaces.

2. An apparatus for supporting and roasting meat in an oven in a manner to minimize heat transfer from the apparatus to the meat and to minimze weight-induced and heat-induced and cell-distorting pressures on the meat comprising a frame and a film supported by the frame, the film having a thickness within the range of about 0.001 inch to 0.01 inch and being formed of a material which is sufficiently flexible to permit the film to conform to the contour of meat of various shapes and of a material which is comfortable to the human hand at roasting temperatures of meat, the film being adapted to support the meat out of contact with the frame and the oven surfaces and having a surface area greater than the surface of the meat about which the film is to conform.

3. The apparatus of claim 2 in which the film is paper.

4. The apparatus of claim 2 in which the film is plastic.

* * * * *